UNITED STATES PATENT OFFICE.

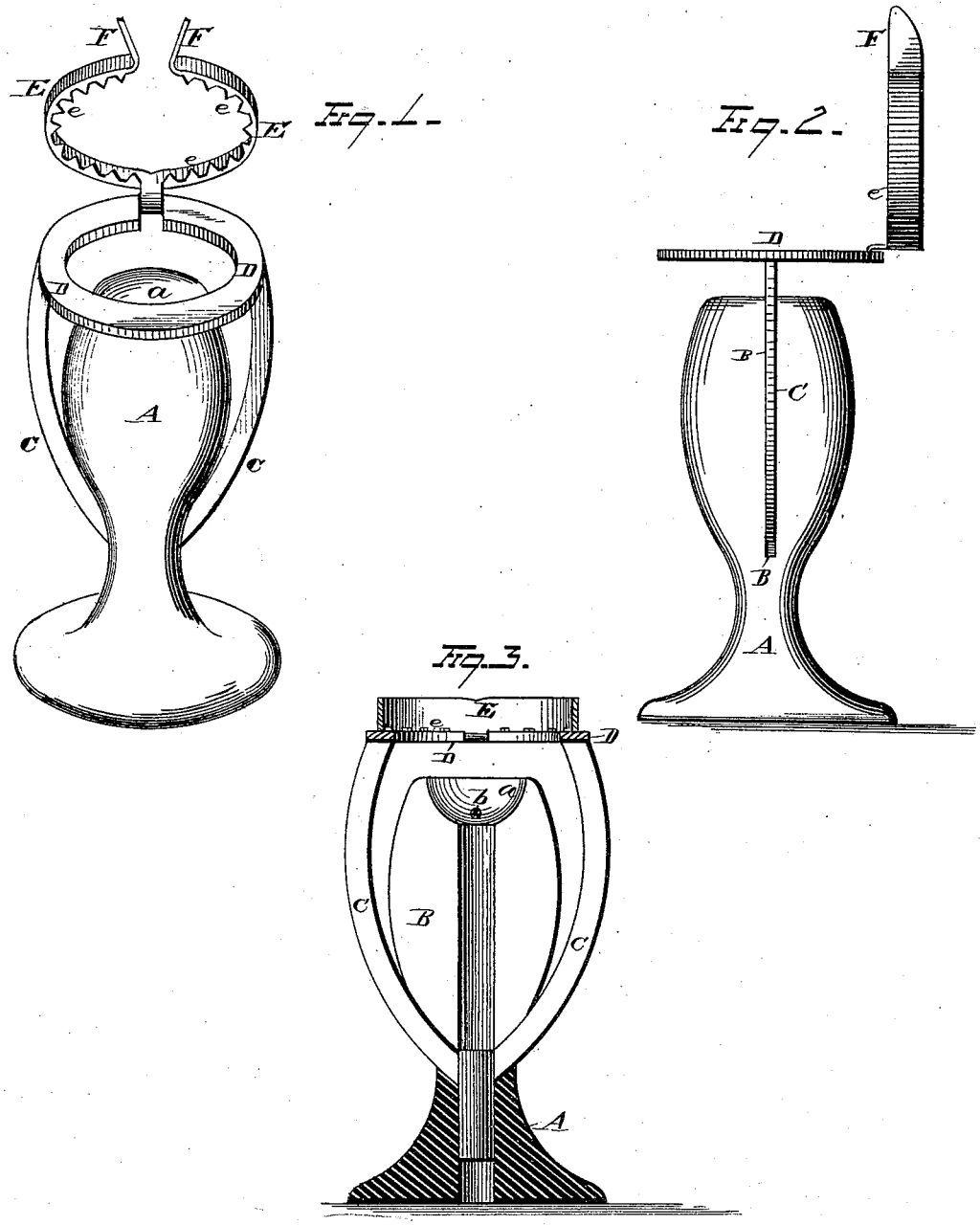

DANIEL H. MURPHY, OF PLAINVILLE, ASSIGNOR OF ONE-HALF HIS RIGHT TO G. J. CAPEWELL, OF CHESHIRE, CONNECTICUT.

IMPROVEMENT IN EGG CUPS AND OPENERS.

Specification forming part of Letters Patent No. 212,394, dated February 18, 1879; application filed July 31, 1878.

*To all whom it may concern:*

Be it known that I, DANIEL H. MURPHY, of Plainville, in the county of Hartford and State of Connecticut, have invented certain new and useful Improvements in Egg Cups and Openers; and I do hereby declare the following to be a full, clear, and exact description of the invention, such as will enable others skilled in the art to which it pertains to make and use it, reference being had to the accompanying drawings, which form part of this specification.

My invention relates to an egg-opener, and is designed to provide a device which shall be adapted to cut and remove from an egg any portion of its shell. It permits of an egg being held in a suitable cup or support while a gage-ring adjusts itself about the same, and a cutter connected with said ring is caused, by the pressure of the thumb and finger of a person, to embrace and cut the shell, and remove from the egg the portion of the shell thus cut.

The invention consists, first, of a cutter formed with either a plain or a serrated working edge, and adapted to embrace and cut an egg-shell; secondly, of a cutter made in annular form of a single piece of spring metal, and adapted by suitable pressure to bear against and cut into an egg-shell on all sides of the same; thirdly, in the combination, with a ring which adjusts itself about an egg, of a cutter hinged thereto, and adapted to annularly cut the egg-shell and remove such cut portion therefrom; fourthly, in the combination, with a gage-ring and an annular cutter connected therewith, of a suitable support adapted to hold the egg while being opened; fifthly, in the combination, with a gage-ring and an annular cutter hinged thereto, of an egg-cup connected with the same by mechanism adapted to allow said ring and cutter to be adjusted relative to the cup.

The invention further consists in certain combinations of parts, as will be hereinafter described and finally claimed.

Referring to the drawings, Figure 1 is a view, in perspective, of my invention. Fig. 2 is a view in side elevation, with the cutter in raised position from the gage-ring. Fig. 3 is a vertical central section.

The support in which the egg is held may be of any desired character; but preferably I provide the cup A, formed with a central top opening, $a$, adapted to receive an egg. The upright central body of this cup is slotted, as shown at B, and provided with any suitable means (here represented by a cross-rod, $b$) which prevent the standards C from becoming removed from said slot. These standards are preferably of curved form, with their upper portions at greater relative distance than their lower portions, in order to allow the egg to be readily placed in its cup, or removed therefrom. They may be of single or double piece, and they support the gage-ring D in vertical adjustment relative to the egg-cup.

This gage-ring may be of any suitable size, and, if desired, it may be of a diameter adapted to fit about the end, the middle, or other portion of an egg. It is provided with a cutter, E, of annular form, made in single piece of spring metal, and having a working edge, $e$, formed horizontally on its lower side. This working edge is preferably provided with teeth or serrations adapted to pierce into the shell; but instead thereof it may be formed plain, with a knife-edge. So, too, this working edge may be formed, if desired, so as to project inwardly at right angles from the upper instead of the lower side of the cutter, and instead of being in single piece it may be formed with two jaws hinged together, and provided or not with suitable spring mechanism adapted to return said jaws to an open position after they have been pressed against the shell in an annular cutting action.

In using the device, the gage-ring together with the cutter are raised from the cup, the egg is placed in the latter, and the gage-ring is then allowed to drop down upon the egg, thus adjusting itself into position proper to permit the cutter to be operated. The cutter is then caused to bear tightly about all sides of the egg, cut into, and open its shell by means of pressure, preferably applied by thumb and finger, respectively, to the two handles F, formed on the ends of the cutter. The cutter is then swung upward and backward on its hinge-joint, so as to raise and remove the cut portion of the shell from the egg.

As herein indicated, I do not restrict myself to the specific form of mechanism for carrying out the main principles of my invention, but may substitute other mechanical means for those shown and described, provided the same are included within the scope of my invention, as appears from the following claims:

Having fully described my invention, what I claim as new, and desire to secure by Letters Patent, is—

1. An egg-opener consisting essentially in the combination, with a suitable egg-support, of a ring which adjusts itself about the egg and a cutter adapted to embrace that portion of the egg-shell to be cut, substantially as set forth.

2. In an egg-opener, a cutter adapted to embrace and cut the egg-shell on all sides, substantially as set forth.

3. In an egg-opener, a cutter formed with either a plain or serrated working edge, and adapted to embrace, cut, and remove from an egg any desired portion of its shell, substantially as set forth.

4. In an egg-opener, an annular cutter formed in single piece of spring metal and adapted by suitable pressure to embrace and cut an egg-shell, substantially as set forth.

5. In an egg-opener, the combination, with a ring which adjusts itself to the egg, of a cutter hinged thereto, and adapted to be pressed about the egg-shell so as to cut the same, substantially as set forth.

6. The combination, with a suitable egg support or cup, of a cutter adapted to embrace and cut the shell of the egg held in the same, substantially as set forth.

7. The combination, with an egg-cup, of a cutter adapted to embrace and cut the shell of the egg, said cutter being vertically adjustable relative to the egg-cup, substantially as set forth.

8. The combination, with an egg-cup formed with a vertical slot in its upright body, of a gage-ring connected therewith by standards which are adapted to be longitudinally moved in said slot, substantially as set forth.

9. The combination, with an egg-cup formed with a vertical slot in its central body, of a gage-ring having hinged thereto an annular cutter, said gage being supported upon curved standards formed in single or double piece, and suitably fastened against removal from said slot, in which they have vertical movement, substantially as set forth.

In testimony that I claim the foregoing I have hereunto set my hand this 24th day of July, 1878.

DANIEL H. MURPHY.

Witnesses:
EDWARD A. CORNWALL,
EDWARD T. CORNWALL.